No. 685,434. Patented Oct. 29, 1901.
E. R. ROSS.
HARNESS.
(Application filed May 16, 1901.)
(No Model.) 2 Sheets—Sheet 1.

Witnesses
Louis E. Kippax.
Fred H. Rhodes.

Inventor
Ella Ross Ross

THE NORRIS PETERS CO., PHOTO-LITHO., WASHINGTON, D. C.

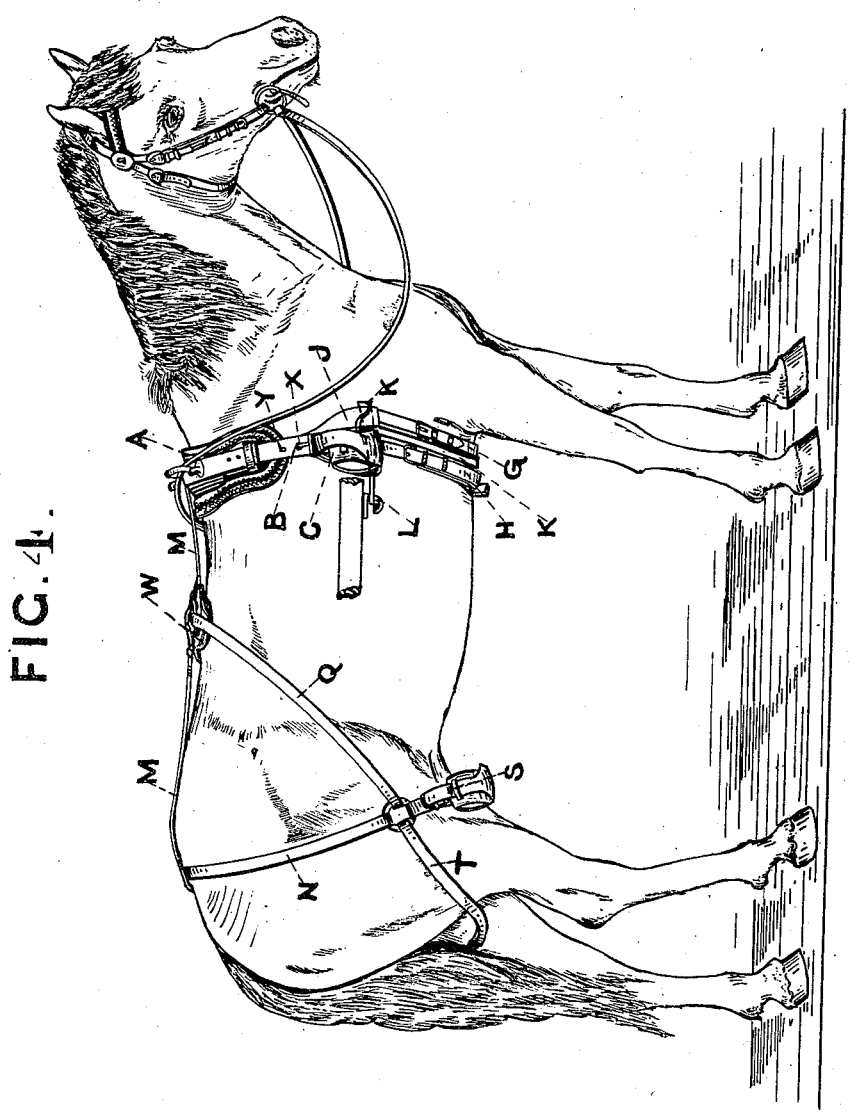

UNITED STATES PATENT OFFICE.

ELLA ROSE ROSS, OF ELLOUGHTON, NEAR HULL, ENGLAND.

HARNESS.

SPECIFICATION forming part of Letters Patent No. 685,434, dated October 29, 1901.

Application filed May 16, 1901. Serial No. 60,552. (No model.)

*To all whom it may concern:*

Be it known that I, ELLA ROSE ROSS, a subject of the King of Great Britain, residing at Elloughton, near Hull, in the county of York, England, have invented new and useful Improvements in or Connected with Harness for Draft-Animals or the Like, of which the following is a specification.

This invention relates to harness or trappings for carriage-horses or light draft-animals, and particularly for trotting ponies and horses being exhibited, and has for its object to provide a simple and improved construction of harness or trappings to enable a horse or the like to draw a vehicle without collar, hames, or traces, so that there is no pressure or rubbing on the shoulders, neck, or chest, thus obviating sore shoulders and allowing of a freer action of the animal's muscles, also preventing kicking and in case of the animal falling allowing of it being easily got out of the shafts, my improved harness being of such a character that it will fit different-sized horses, the pull being evenly divided and the whole set simple, cheap, light, and effective.

Figure 1:
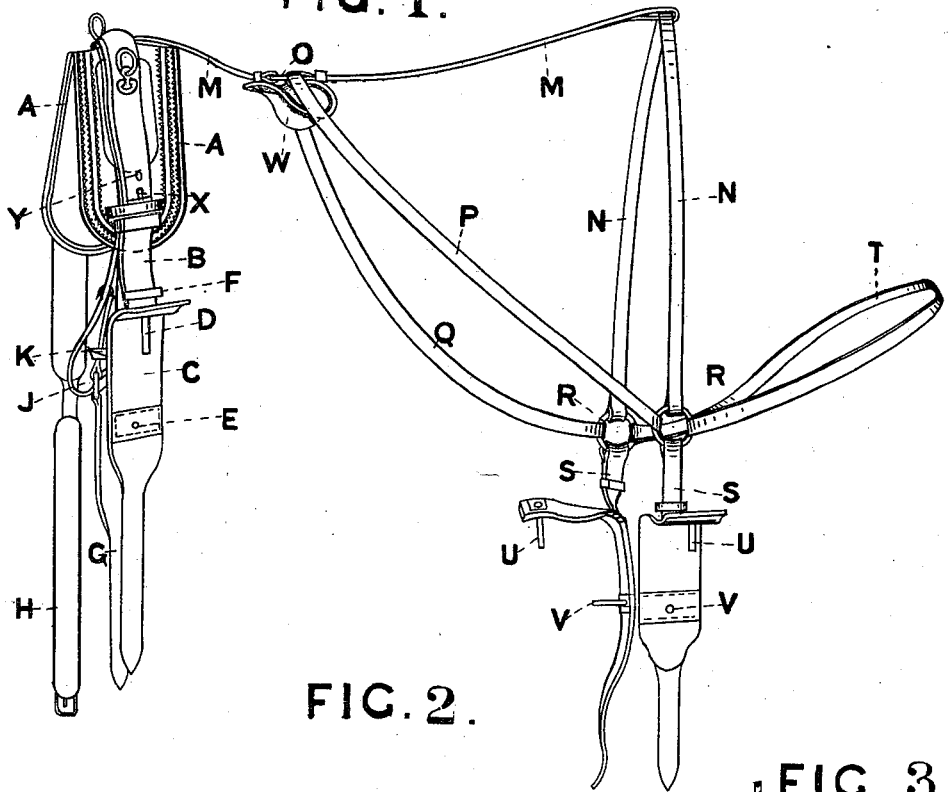
Figure 2:
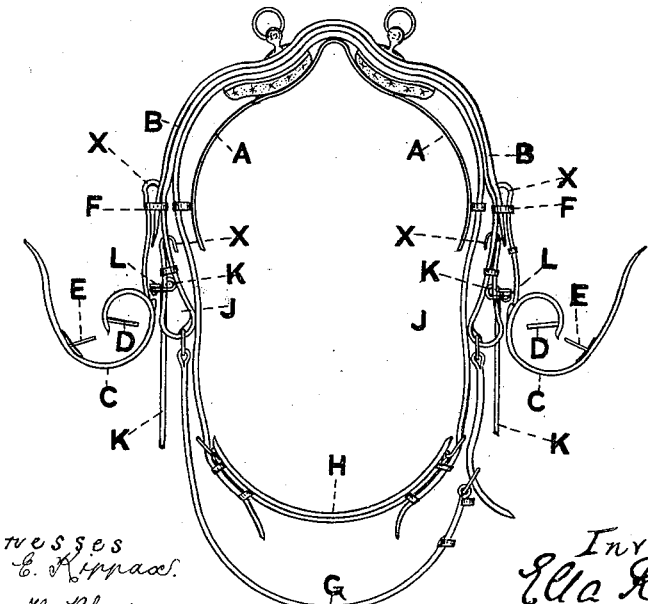
Figure 3:
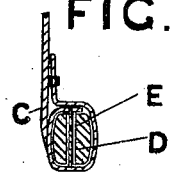

Figure 1 represents a perspective view of my improved construction of harness or trappings for horses or light draft-animals. Fig. 2 represents a front view of the saddle with the front drawing-straps with their tugs, the body-band with loops to take the vehicle-shafts, and check-straps for preventing the loops accidentally leaving the shafts. Fig. 3 represents a sectional view of part of a shaft with tug in position. Fig. 4 shows a view of a horse with a set of my improved harness or trappings on it.

For the purpose of my invention I employ any suitable kind of harness-saddle A, which preferably fits about the center of the horse's back. The front drawing-straps B, attached to such saddle A, are provided with tugs which consist of broad straps C, provided with a metal or other suitable sleeve D and a pin E, the sleeve D passing through a hole in the shaft of the vehicle and the pin E fitting into the said sleeve D when the strap C is brought around the shaft, the end of the strap C being passed through a loop F, which may be an integral part of such strap. The said saddle has also two body-bands G and H, one of which may have loops J, if desired, to take the shafts of the vehicle, and for the purpose of preventing the loops J from accidentally coming off the shafts I may employ a check-strap K, which has both its ends attached to twisted hooks L, fitted to the shafts of the vehicle. This strap is preferably in two pieces, and either piece has one end attached to one of the hooks L and is passed through one of the loops J and given a turn, being brought under the horse's body and the two pieces connected by means of a buckle or the like. I employ a connecting-strap M, which runs from the saddle to the center of the kicking-strap N. This connecting-strap is preferably in two pieces, which are attached to a ring or combined set of buckles O, from which also run two straps P Q, which I call the "back drawing-straps." These back drawing-straps have each a ring or set of buckles R at their terminals, and these rings or sets of buckles also take the said kicking-strap N, the back drawing-tugs S, and the breech-band T, the back drawing-tugs being each provided with a sleeve U and a pin V in the same manner as are the front drawing-tugs before described. A small supplementary saddle W may be employed at the point on the connecting-strap where the ring or set of buckles O, which take the back drawing-straps P Q, are situated, such saddle being underneath the ring or buckles aforesaid, thereby preventing such ring or buckles from chafing the animal's back.

In place of employing buckles for taking up or letting down the tugs and the loops the straps of such tugs and loops may be provided with hooks X to engage with the holes Y in the straps.

Harness constructed as above described is light and graceful in appearance and allows of the animal being seen to the best advantage. At the same time it is simple, cheap, and effective.

What I claim as my invention, and desire to secure by Letters Patent, is—

1. A harness for draft-animals comprising a saddle and body-bands arranged at its front part and provided with attachments for the shafts, a kicking-strap N at its rear part, a connecting-strap between the said saddle and the middle part of the kicking-strap, diagonal back drawing-straps P and Q between the said connecting-strap and the end portions of the kicking-strap, a breech-band connected to the end portions of the kicking-strap, and back drawing-tugs also secured to the end portions of the kicking-strap, substantially as described and shown.

2. The combination, with harness provided with means for securing it to the body of an animal, of shaft-straps secured to the said harness and provided with projecting tubular sleeves for engaging with holes in the shafts, and pins also secured to the said shaft-straps and slidable within the said tubular sleeves, substantially as set forth.

In testimony whereof I affix my signature in the presence of two witnesses.

ELLA ROSE ROSS.

Witnesses:
LOUIS E. KIPPAX,
FRED H. RHODES.